United States Patent
Katashi

(10) Patent No.: US 7,603,902 B2
(45) Date of Patent: Oct. 20, 2009

(54) TEMPERATURE COMPENSATION CIRCUIT, TRIMMING CIRCUIT, AND ACCELERATION DETECTOR

(75) Inventor: Murayama Katashi, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 56 days.

(21) Appl. No.: 12/120,246

(22) Filed: May 14, 2008

(65) Prior Publication Data

US 2008/0302182 A1     Dec. 11, 2008

(30) Foreign Application Priority Data

Jun. 6, 2007   (JP) .............. 2007-150606

(51) Int. Cl.
    *G01P 3/00*   (2006.01)
(52) U.S. Cl. .............. 73/497; 327/83; 327/138
(58) Field of Classification Search .......... 73/497; 327/513, 525, 83, 138
    See application file for complete search history.

(56) References Cited

U.S. PATENT DOCUMENTS

| | | | | |
|---|---|---|---|---|
| 3,030,814 A | * | 4/1962 | Ainsworth | 73/503 |
| 3,708,754 A | * | 1/1973 | Diehl | 330/1 A |
| 4,128,010 A | * | 12/1978 | Aske | 73/497 |
| 4,144,764 A | * | 3/1979 | Hartzell, Jr. | 73/497 |
| 4,336,718 A | * | 6/1982 | Washburn | 73/497 |
| 4,430,894 A | * | 2/1984 | Albert et al. | 73/497 |
| 4,694,696 A | * | 9/1987 | Hojo et al. | 73/497 |
| 4,697,455 A | * | 10/1987 | Norling | 73/497 |
| 4,887,467 A | * | 12/1989 | Sakuma et al. | 73/497 |
| 5,220,831 A | * | 6/1993 | Lee | 73/497 |
| 5,241,850 A | | 9/1993 | Kawate | |
| 6,269,696 B1 | | 8/2001 | Weinberg et al. | |
| 2003/0144808 A1 | | 7/2003 | Savard | |
| 2005/0274180 A1 | | 12/2005 | Zhao et al. | |

FOREIGN PATENT DOCUMENTS

WO   2005086343 A1   9/2005

* cited by examiner

*Primary Examiner*—Hezron Williams
*Assistant Examiner*—Samir M Shah
(74) *Attorney, Agent, or Firm*—Charles Bergere

(57) ABSTRACT

A temperature compensation circuit having satisfactory linearity, a trimming circuit including a plurality of temperature gradients, and an acceleration detector having a wide applicable temperature range. A plurality of resistor elements R1 to R4, R5 to R8, R21 to R24, R25 to R28 are connected in series between a power supply voltage line and a ground voltage line. Resistor elements R9 to R14 are connected in series between connection nodes N1 and N3. Resistor elements R29 to R34 are connected in series between connection nodes N2 and N4. The resistor elements R1, R2, R4, R5, R7 to R14, R24, R25 have negative temperature coefficients. The resistor elements R3, R6, R21 to R23, R26 to R34 have positive temperature coefficients. An output terminal NT5 connects a connection node of the resistor elements R13 and R14 and a connection node of the resistor elements R30 and R29.

5 Claims, 3 Drawing Sheets

TEMPERATURE COMPENSATION CIRCUIT, TRIMMING CIRCUIT, AND ACCELERATION DETECTOR

BACKGROUND OF THE INVENTION

The present invention relates to a temperature compensation circuit that varies its output in accordance with a temperature change, a trimming circuit using such a temperature compensation circuit, and an acceleration detector using such a trimming circuit.

Temperature compensation circuits are nowadays used to compensate for variations caused by a temperature change so as to maintain a constant output (for example, refer to International Publication No. WO 2005/086343). The temperature compensation circuit described in International Publication No. WO 2005/086343 is incorporated in a series regulator. The temperature compensation circuit includes a regulator circuit and a resistor coupling, which is formed by at least two resistor elements. The resistor coupling adjusts a temperature coefficient gradient to compensate for voltage variations caused by a temperature change.

Another type of temperature compensation circuit adjusts the temperature gradient. This circuit includes, between a power supply voltage line and a ground voltage line, a line of first and second resistor means, which are connected in series, and a line of third and fourth resistor means, which are connected in series. In this temperature compensation circuit, the first and fourth resistor means are each formed by two resistor elements having negative temperature coefficients, and the second and third resistor means are each formed by a resistor element having a negative temperature coefficient and a resistor element having a positive temperature coefficient. Further, a plurality of series-connected resistor elements are connected between a first connection node of the first and second resistor means and a second connection node of the third and fourth resistor means. An output is retrieved from the line connecting the first and second connection nodes.

Depending on the application, a temperature compensation circuit having a wide applicable temperature range may be required. For example, the temperature compensation circuit may be employed in an acceleration detector, which is used in locations where the temperature changes greatly. However, the conventional temperature compensation circuit has a narrow applicable temperature range. Thus, when the conventional temperature compensation circuit is applied for a wide temperature range, the linearity becomes poor. This is because the resistance of the resistor elements in the temperature compensation circuit does not vary in the manner of a first order function as the temperature changes. Rather, the resistance actually varies along a curve based on a second order or third order function. When the applied temperature range is narrow, the influence of high order functions is small enough to be ignorable. Thus, the conventional temperature compensation circuit can be used. However, when the applied temperature range is widened, the influence of high order functions becomes significant.

SUMMARY OF THE INVENTION

The present invention provides a temperature compensation circuit having satisfactory linearity, a trimming circuit including a plurality of temperature gradients, and an acceleration detector having a wide applicable temperature range.

One aspect of the present invention is a temperature compensation circuit including a first resistor means and a second resistor means connected in series between a high potential power supply voltage line and a low potential power supply voltage line. A third resistor means and a fourth resistor means are connected in series between the high potential power supply voltage line and the low potential power supply voltage line. A fifth resistor means and a sixth resistor means are connected in series between the high potential power supply voltage line and the low potential power supply voltage line. A seventh resistor means and an eighth resistor means are connected in series between the high potential power supply voltage line and the low potential power supply voltage line. A ninth resistor means connects a first connection node of the first resistor means and the second resistor means and a second connection node of the third resistor means and the fourth resistor means. A tenth resistor means connects a third connection node of the fifth resistor means and the sixth resistor means and a fourth connection node of the seventh resistor means and the eighth resistor means. The first and fourth resistor means have a first characteristic, which is a negative temperature coefficient that decreases the resistance as the temperature rises. The second and third resistor means have a second characteristic, which is a temperature coefficient that is greater than the temperature coefficient of the first characteristic. The fifth and eighth resistor means have a third characteristic, which is a positive temperature coefficient that varies symmetrically to the first characteristic. The sixth and seventh resistor means has a fourth characteristic, which is a temperature coefficient that is smaller than the temperature coefficient of the third characteristic and varies symmetrically to the second characteristic. An output terminal is defined by a node connecting a first connection line, which connects the first connection node and the second connection node, and a second connection line, which connects the third connection node and the fourth connection node.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
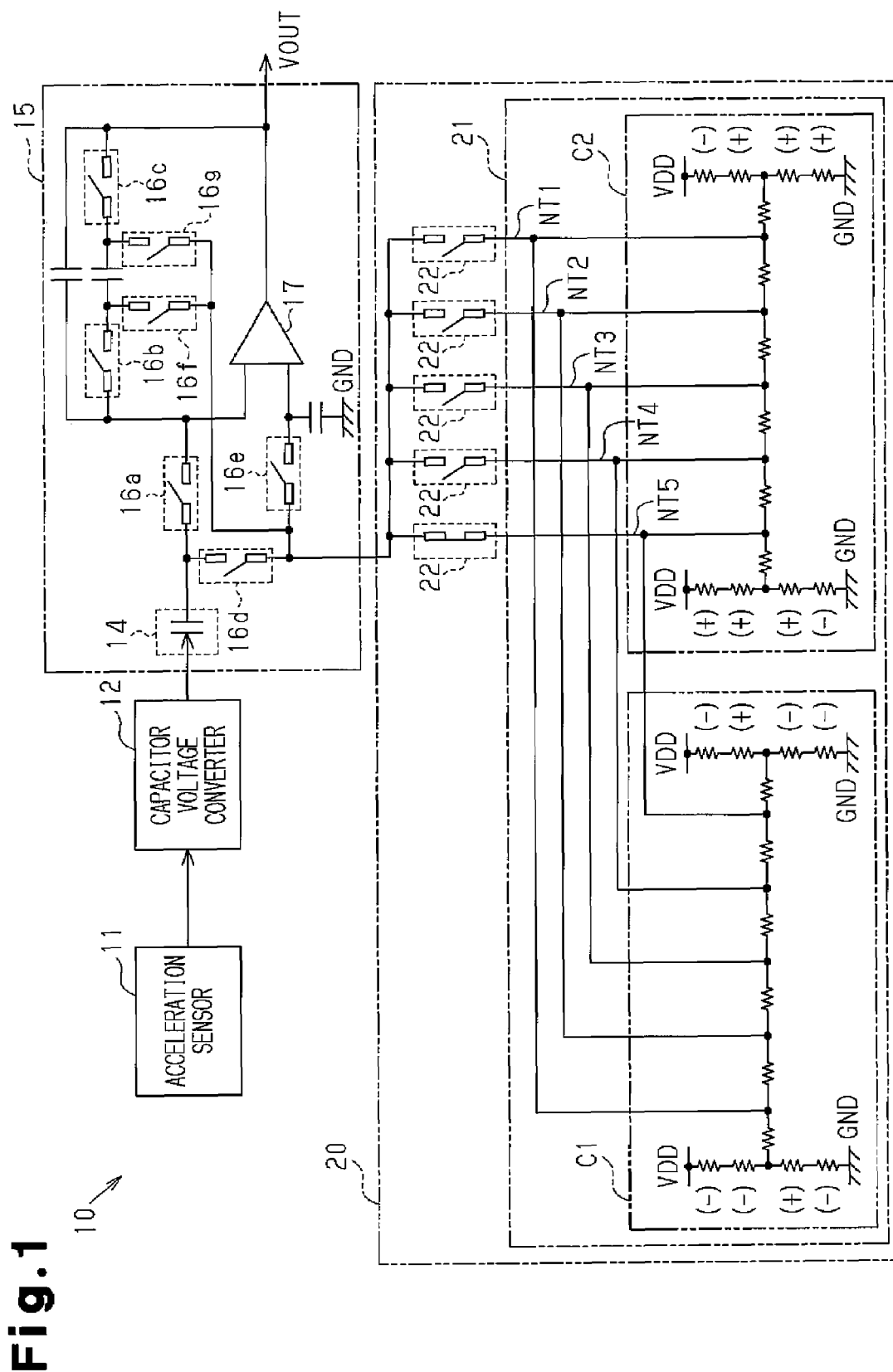
FIG. 1 is a schematic circuit diagram of an acceleration detector including a trimming circuit according to the present invention.
Figure 2:
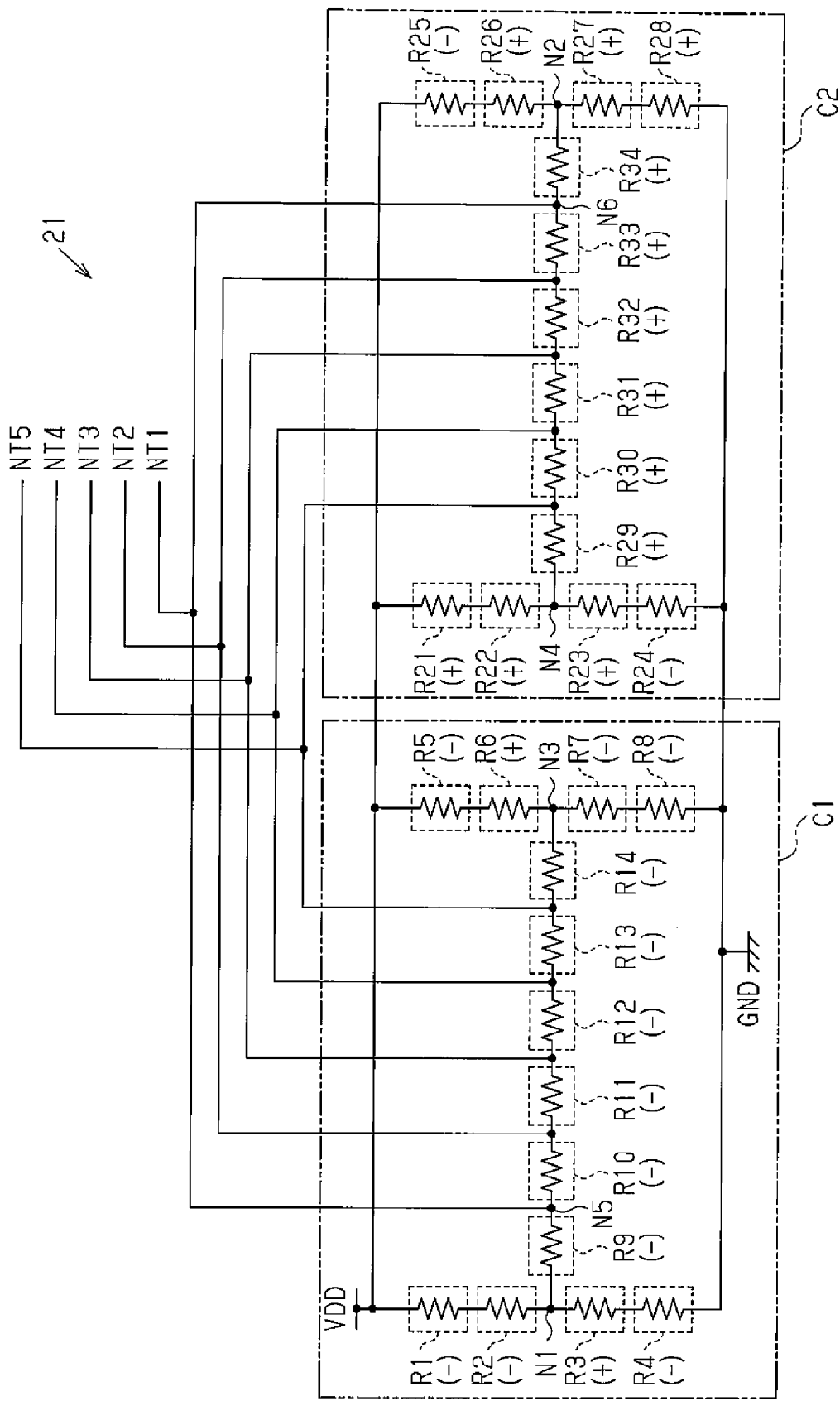
FIG. 2 is a circuit diagram of a temperature compensation circuit according to the present invention.

A preferred embodiment of the present invention will now be discussed with reference to FIGS. 1 to 3. An acceleration detector 10 including a temperature compensation circuit will be described with reference to FIG. 1. The acceleration detector 10 includes an acceleration sensor 11, which uses capacitance to detect acceleration, a capacitor voltage converter 12, which converts capacitance to voltage, an output amplification circuit 15, and a trimming circuit 20.

The acceleration sensor 11, the capacitance of which varies in accordance with acceleration, outputs a signal having an intensity that is in accordance with the capacitance. The acceleration sensor 11 linearly increases the output capacitance as the temperature rises.

The capacitor voltage converter 12 outputs a voltage that is in accordance with the supplied capacitance.

The output amplification circuit 15, which functions as an amplification means and includes a switched capacitor circuit, is formed by a capacitor 14, a plurality of switches 16a, 16b, 16c, 16d, 16e, 16f, and 16g, an operational amplifier 17, and a plurality of further capacitors.

The capacitor 14 transmits the output voltage of the capacitor voltage converter 12 to the output amplification circuit 15. The switches 16a to 16c are synchronously activated and deactivated. Further, the switches 16d to 16g are synchronously activated and deactivated. When the switches 16a to 16c are deactivated, the switches 16d to 16g are activated. When the switches 16a to 16c are activated, the switches 16d to 16g are deactivated. As a result, in the present embodiment, the output amplification circuit 15 amplifies the difference between the maximum voltage and minimum voltage of a square wave output from the capacitor voltage converter 12.

A connection node of the switches 16d and 16e is connected to the trimming circuit 20, which includes a temperature compensation circuit 21. The trimming circuit 20 includes a plurality of fuses 22 respectively associated with a plurality of output terminals NT1, NT2, NT3, NT4, and NT5 of the temperature compensation circuit 21. The fuses 22 are open except for the one that is connected to the output terminal NT5, which is suitable for compensating for temperature changes of the acceleration sensor 11. The operational amplifier 17 amplifies the output of the acceleration sensor 11 to generate an output voltage VOUT of the acceleration detector 10, while performing a comparison with voltage variations at the output terminal of the temperature compensation circuit 21 connected by the fuse.

The temperature compensation circuit 21 will now be discussed with reference to FIG. 2.

The temperature compensation circuit 21 includes a reference circuit C1, which serves as a first circuit, and a complementary circuit, which serves as a second circuit.

In the reference circuit C1, resistor elements R1, R2, R3, and R4 are connected in series between a power supply voltage line for power supply voltage (high potential power supply voltage line) and a ground voltage line for ground voltage (low potential power supply voltage line). Further, in the reference circuit C1, resistor elements R5, R6, R7, and R8 are connected in series between the power supply voltage line and the ground voltage line. Resistor elements R9, R10, R11, R12, R13, and R14 are connected in series between a connection node N1 (first connection node) of the resistor elements R2 and R3 and a connection node N3 (second connection node) of the resistor elements R6 and R7. In the present embodiment, the resistor elements R1 and R2 function as a first resistor means, the resistor elements R3 and R4 function as a second resistor means, the resistor elements R5 and R6 function as a third resistor means, the resistor elements R7 and R8 function as a fourth resistor means, and the resistor elements R9 to R14 function as a ninth resistor means.

In the present embodiment, resistor elements having a negative temperature coefficient so that the resistance decreases as the temperature rises are used as the resistor elements R1, R2, R4, R5, R7 to R14 of the reference circuit C1. Further, resistor elements having a positive temperature coefficient so that the resistance increases as the temperature falls are used as the resistor elements R3 and R6 of the reference circuit C1. In FIG. 2, minus (−) signs are added to resistor elements having a negative temperature coefficient, and positive (+) signs are added to resistor elements having a positive temperature coefficient. The second and third resistor means each include a resistor element having a negative temperature coefficient and a resistor element having a positive temperature coefficient.

In the present embodiment, the resistances of the resistor elements R1 to R8 are set so that the first to fourth resistor means have the same synthesized resistance under a normal temperature (in the present embodiment, 27° C.). Thus, when a resistor element is represented by Ri (i being an integer) and the resistance is represented by r(Ri), the next equation is satisfied.

$$r(R1)+r(R2)=r(R3)+r(R4)=r(R5)+r(R6)=r(R7)+r(R8)$$

Further, in the present embodiment, the resistor elements R9 to R14 are set to have the same resistance.

In the complementary circuit C2, resistor elements R21, R22, R23, and R24 are connected in series between the power supply voltage line and the ground voltage line. Further, resistor elements R25, R26, R27, and R28 are connected in series between the power supply voltage line and the ground voltage line. Resistor elements R29, R30, R31, R32, R33, and R34 are connected in series between a connection node N2 (fourth connection node) of the resistor elements R26 and R27 and a connection node N4 (third connection node) of the resistor elements R22 and R23. In the present embodiment, the resistor elements R21 and R22 function as a fifth resistor means, the resistor elements R23 and R24 function as a sixth resistor means, the resistor elements R25 and R26 function as a seventh resistor means, the resistor elements R27 and R28 function as an eighth resistor means, and the resistor elements R29 to R34 function as a tenth resistor means.

In the present embodiment, the resistor elements R21 and R22, which form the fifth resistor means, have positive temperature coefficients. Thus, the resistor elements R21 and R22 have temperature coefficients opposite to that of the resistor elements R1 and R2 forming the first resistor means.

The resistor elements R23 and R24 forming the sixth resistor means respectively have a positive temperature coefficient and a negative temperature coefficient. Further, the resistor elements R23 and R24 respectively have the same temperature coefficients as the resistor elements R3 and R4 forming the second resistor means.

The resistor elements R25 and R26 forming the seventh resistor means respectively have a negative temperature coefficient and a positive temperature coefficient. Further, the resistor elements R25 and R26 respectively have the same temperature coefficients as the resistor elements R5 and R6 forming the third resistor means.

The resistor elements R27 and R28 forming the eighth resistor means have positive temperature coefficients. Thus, the resistor elements R27 and R28 have temperature coefficients opposite to that of the resistor elements R7 and R8 forming the fourth resistor means.

The resistor elements R29 to R34 forming the tenth resistor means have positive temperature coefficients. Thus, the resistor elements R29 to R34 have temperature coefficients opposite to that of the resistor elements R9 to R14 forming the ninth resistor means.

In the present embodiment, the resistances of the resistor elements R21 to R28 are set so that the fifth to eighth resistor means have the same synthesized resistance under a normal temperature. Thus, the next equation is satisfied.

$$r(R21)+r(R22)=r(R23)+r(R24)=r(R25)+r(R26)=r(R27)+r(R28)$$

Further, in the present embodiment, the resistor elements R29 to R34 are set to have the same resistance under a normal temperature. This resistance is equal to the resistance of the resistor elements R9 to R14.

A connection node N5 of the resistor elements R9 and R10 in the reference circuit C1 and a connection node N6 of the resistor elements R34 and R33 in the complementary circuit C2 are connected to each other and to the fuse 22 serving as the output terminal NT1 of the temperature compensation circuit 21. A connection node of the resistor elements R10 and R11 in the reference circuit C1 and a connection node of the resistor elements R33 and R32 in the complementary circuit C2 are connected to each other and to the fuse 22 serving as the output terminal NT2. A connection node of the resistor elements R11 and R12 in the reference circuit C1 and a connection node of the resistor elements R32 and R31 in the complementary circuit C2 are connected to each other and to the fuse 22 serving as the output terminal NT3. A connection node of the resistor elements R12 and R13 in the reference circuit C1 and a connection node of the resistor elements R31 and R30 in the complementary circuit C2 are connected to each other and to the fuse 22 serving as the output terminal NT4. A connection node of the resistor elements R13 and R14 in the reference circuit C1 and a connection node of the resistor elements R30 and R29 in the complementary circuit C2 are connected to each other and to the fuse 22 serving as the output terminal NT5.

In the present embodiment, when manufacturing the acceleration detector 10, the fuses 22 are all connected. Subsequently, the one of the output terminals NT1 to NT5 that varies the voltage in a manner most suitable for the voltage characteristics of the acceleration sensor 11 is selected. Then, a laser or the like is used to break, or open, the fuses connected to the non-selected output terminals. In the present embodiment, as shown in FIG. 1, the output terminal NT5 is selected, and the fuse 22 connected to the output terminal NT5 remains closed. The fuses 22 connected to the other output terminals NT1 or NT4 are broken.

Changes in the resistances at the connection nodes N1 to N4 due to the temperature will now be described with reference to FIG. 3.

Under a normal temperature, the sum of the resistances of the resistor elements R1 and R2, the sum of the resistances of the resistor elements R3 and R4, the sum of the resistances of the resistor elements R5 and R6, the sum of the resistances of the resistor elements R7 and R8, the sum of the resistances of the resistor elements R21 and R22, the sum of the resistances of the resistor elements R23 and R24, the sum of the resistances of the resistor elements R25 and R26, and the sum of the resistances of the resistor elements R27 and R28 are the same. Thus, the voltage is the same at the connection nodes N1 to N4, and current does not flow to the resistor elements R9 to R14 and R29 to R34.

When the temperature rises from the normal temperature, the resistances of the resistor elements R3, R6, R21 to R23, and R26 to R34, which have positive temperature coefficients, increase. Further, the resistances of the resistor elements R1, R2, R4, R5, R7 to R14, R24, and R25, which have negative temperature coefficients, decrease.

Thus, in the reference circuit C1, the sum of the resistor elements R1 and R2 becomes smaller than the sum of the resistor elements R5 and R6. Further, the sum of the resistor elements R3 and R4 becomes greater than the sum of the resistor elements R7 and R8. This increases the voltage at the connection node N1 and decreases the voltage at the connection node N3.

In the reference circuit C1, the sum of the resistor elements R21 and R22 becomes greater than the sum of the resistor elements R25 and R26. Further, the sum of the resistor elements R23 and R24 becomes smaller than the sum of the resistor elements R27 and R28. This increases the voltage at the connection node N2 and decreases the voltage at the connection node N4.

When the temperature falls from the normal temperature, the resistances of the resistor elements R3, R6, R21 to R23, and R26 to R34, which have positive temperature coefficients, decrease. Further, the resistances of the resistor elements R1, R2, R4, R5, R7 to R14, R24, and R25, which have negative temperature coefficients, increase.

Thus, the sum of the resistor elements R1 and R2 becomes greater than the sum of the resistor elements R5 and R6. The sum of the resistor elements R3 and R4 becomes smaller than the sum of the resistor elements R7 and R8. This decreases the voltage at the connection node N1 and increases the voltage at the connection node N3. Additionally, the sum of the resistor elements R21 and R22 becomes smaller than the sum of the resistor elements R25 and R26. The sum of the resistor elements R23 and R24 becomes greater than the sum of the resistor elements R27 and R28. This decreases the voltage at the connection node N2 and increases the voltage at the connection node N4.

Figure 3A:
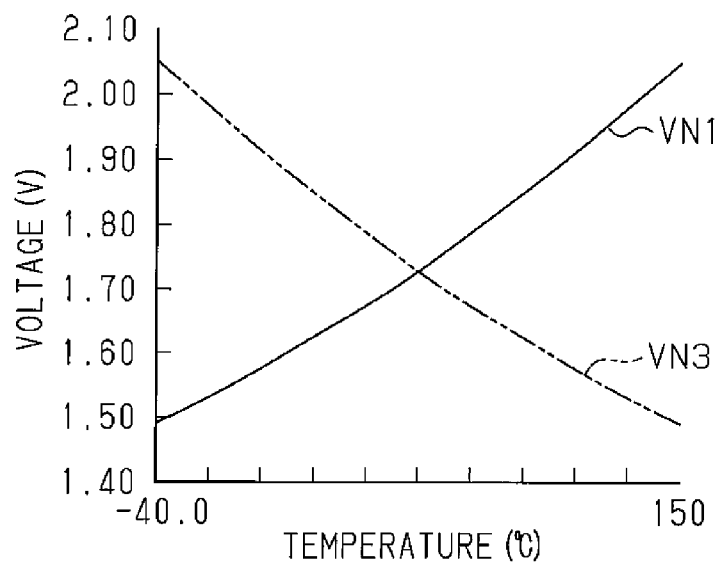
FIG. 3A is a diagram showing voltage variations at a node in a reference circuit as the temperature changes.

FIG. 3A shows changes in the voltage VN1 at the connection node N1 and changes in the voltage VN3 at the connection node N3 that result from changes in the temperature. In the present embodiment, the resistor elements R9 to R14 have the same characteristics and the same resistances. Thus, the voltages at the connection node N5, the connection node of the resistor elements R10 and R11, the connection node of the resistor elements R11 and R12, the connection node of the resistor elements R12 and R13, and the connection node of the resistor elements R13 and R14 have values obtained by dividing the difference between the voltage VN1 and the voltage VN3. For example, the voltage at the connection node N5 of the resistor elements R9 and R10 may be expressed by [VN1−(VN1−VN3)/6].

The voltage VN3 at the connection node N3 changes in a manner symmetric to changes in the voltage VN1 at the connection node N1. In other word, the voltage VN3 and the voltage VN1 vary along gradients in opposite directions such that the gradient has the same absolute value. The voltages at the connection nodes located between the connection nodes N1 and N3 (i.e., the connection node between the resistor elements R11 and R12) remain constant regardless of the temperature.

The resistance R(T) of each resistor element when using temperature as a parameter is expressed by the equation shown below.

$$R(T)=Rt0*[1+(T-Tnom)*tc1+(T-Tnom)^2*tc2] \quad (1)$$

Here, T represents the temperature (centigrade degrees), Rt0 represents the resistance for the normal temperature Tnom, and tc1 and tc2 represent temperature coefficients.

The resistance R(V) of each resistor element when using voltage as a parameter is expressed by the equation shown below.

$$R(V)=Rv0*[1+V*vc1+V^2*vc2] \quad (2)$$

Here, V represents voltage, Rv0 represent the resistance for zero volts, and vc1 and vc2 represent voltage coefficients.

As apparent from equation (1) and FIG. 3A, when the temperature changes, the voltages at the connection nodes N1 and N3 vary along a downwardly bulged curve. Therefore, the voltages VN1 and VN3 vary in a generally linear manner near the normal temperature Tnom but are greatly affected by the second order function term $[(T-Tnom)^2*tc2]$ in equation (1) at temperatures separated from the normal temperature Tnom, such as −40° C. or 150° C.

Figure 3B:
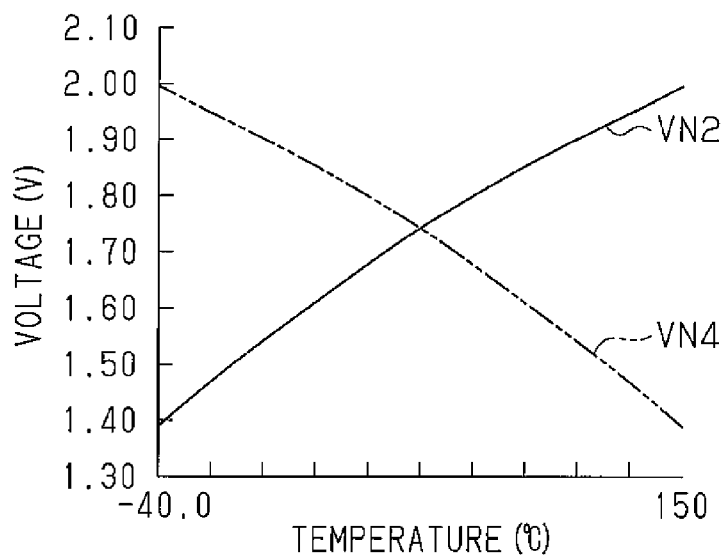
FIG. 3B is a diagram showing voltage variations at a node in a complementary circuit as the temperature changes.

FIG. 3B shows changes in the voltage VN2 at the connection node N2 and changes in the voltage VN4 at the connection node N4 that result from changes in the temperature. In the present embodiment, the resistor elements R29 to R34 have the same characteristics and the same resistances. Thus, the voltages at the connection node N6; the connection node of the resistor elements R33 and R32, the connection node of the resistor elements R32 and R31, the connection node of the resistor elements R31 and R30, and the connection node of the resistor elements R30 and R29 have values obtained by dividing the difference between the voltage VN2 and the voltage VN4. For example, the voltage at the connection node N6 of the resistor elements R33 and R34 may be expressed by [VN2−(VN2−VN4)/6].

The voltage VN4 at the connection node N4 changes in a manner symmetric to changes in the voltage VN2 at the connection node N2. The voltage at the connection node located at the middle of the connection nodes N2 and N4 (i.e., the connection node between the resistor elements R31 and R32) remains constant regardless of the temperature. The voltages VN2 and VN4 vary in a generally linear manner near the normal temperature Tnom but are greatly affected by the second order function term $[(T-Tnom)^2*tc2]$ in equation (1) at temperatures greatly separated from the normal temperature Tnom, such as −40° C. or 150° C. Thus, the voltages VN2 and VN4 vary along an upwardly bulged curve.

Figure 3C:
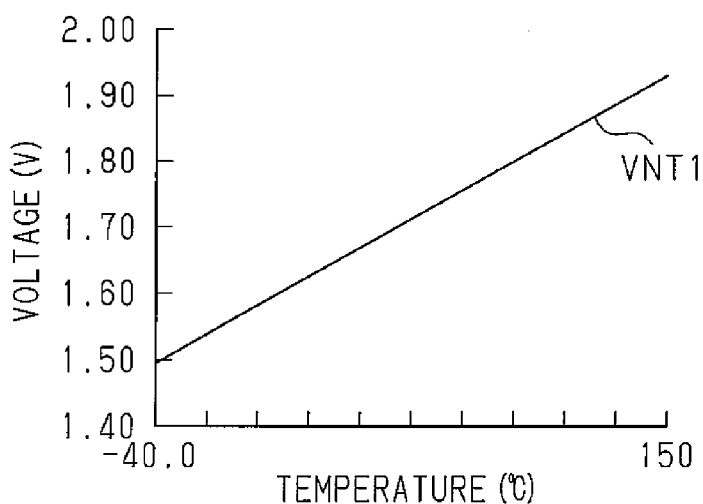
FIG. 3C is a diagram showing voltage variations at an output terminal of the temperature compensation circuit.

The output terminals NT1 to NT5 of the temperature compensation circuit 21 connect connection nodes having the same temperature change gradient. Therefore, the voltages at the output terminals NT1 to NT5 offset the value of a second order function term and vary in a further linear manner in the entire range of −40° C. to 150° C. FIG. 3C shows changes in the voltage VNT1 at the output terminal NT1, which is connected to the connection nodes N5 and N6, resulting from changes in the temperature. As apparent from FIG. 3C, the voltage VNT1 offsets the value of a second order function term and varies in a further linear manner entirely in the wide temperature range of −40° C. to 150° C.

The present embodiment has the advantages described below.

In the present embodiment, the reference circuit C1 includes the resistor elements R1 to R4, which are connected in series, and the resistor elements R5 to R8, which are connected in series, between the power supply voltage line for the power supply voltage VDD and the ground voltage line for the ground voltage GND. The resistor elements R9 to R14 are connected in series between the connection node N1 of the resistor elements R2 and R3 and the connection node N3 of the resistor elements R6 and R7. The complementary circuit C2 includes the resistor elements R21 to R24, which are connected in series, and the resistor elements R25 to R28, which are connected in series, between the power supply voltage line and the ground voltage line. The resistor elements R1, R2, R4, R5, R7 to R14, R24, and R25 have negative temperature coefficients. The resistor elements R3, R6, R21 to R23, and R26 to R34 have positive temperature coefficients. The output terminal NT5 is formed by connecting the connection node of the resistor elements R13 and R14 and the connection node of the resistor elements R30 and R29. The output terminal NT5 is connected by a fuse 22 to the output amplification circuit 15. Under a normal temperature, the connection nodes N1 to N4 have the same voltage. However, when the temperature rises from the normal temperature, the voltage at the connection node N1 increases, the voltage at the connection node N3 decreases, the voltage at the connection node N2 decreases, and the voltage at the connection node N4 increases. Accordingly, the connection of connection nodes having the same gradient with respect to temperature changes offsets the values of second order function terms with the reference circuit C1 and the complementary circuit C2. Thus, as the temperature changes, the output voltages of the output terminals vary in a further linear manner. This improves the output voltage linearity of the temperature compensation circuit 21.

In the present embodiment, the resistor elements R9 to R14, which form the ninth resistor means, and the resistor elements R29 to R34, which form the tenth resistor means, are set to have the same value under a normal temperature. Thus, a voltage drop in the line connecting the connection node N1 and the connection node N3 (i.e., first connection line) is a value equally divided in accordance with the number of the resistor elements R9 to R14. Further, a voltage drop in the line connecting the connection node N2 and the connection node N4 (i.e., second connection line) is a value equally divided in accordance with the number of the resistor elements R29 to R34. Accordingly, by forming the output terminals NT1 to NT5 at locations connecting connection nodes where the number of resistor elements from the connection node N1 and the number of resistor elements from the connection node N2 are the same, a plurality of output voltages having different voltage gradients when the temperature changes are output with satisfactory linearity.

In the present embodiment, the resistor elements R9 to R14, which are connected in series between the connection nodes N1 and N3 of the reference circuit C1, have the same negative temperature coefficient as the resistor elements R1, R2, R7, and R8 of the first resistor means and the fourth resistor means. Thus, when the resistances of the resistor elements R1, R2, R7, and R8 decreases, the resistances of the resistor elements R9 to R14 decreases. As a result, current smoothly flows to the resistor elements R1, R2, R9 to R14, R7, and R8. This reduces energy loss. Further, the resistor elements R29 to R34, which are connected in series between the connection nodes N2 and N4, have the same positive temperature coefficient as the resistor elements R21, R22, R27, and R28 of the fifth resistor means and the sixth resistor means. Thus, when the resistances of the resistor elements R21, R22, R27, and R28 decreases, the resistances of the resistor elements R29 to R34 decreases. As a result, current smoothly flows to the resistor elements R21, R22, R29 to R34, R27, and R28. This reduces energy loss.

In the present embodiment, the trimming circuit 20 includes the temperature compensation circuit 21 and the plurality of fuses 22 respectively connected to the output terminals NT1 to NT5 of the temperature compensation circuit 21. In the present embodiment, the trimming circuit 20 outputs a plurality of output voltages varied along different gradients as the temperature changes by connecting voltages varied along the same gradient as the temperature changes. By breaking the fuses 22 except for the one connected to the output terminal that outputs the voltage most suitable for temperature changes of the acceleration detector 10, the trimming circuit 20 performs further accurate voltage compensation when the temperature changes. Accordingly, the acceleration detector 10, which includes the trimming circuit 20, reduces output errors and increases output accuracy even when used in a wide temperature range.

It should be apparent to those skilled in the art that the present invention may be embodied in many other specific forms without departing from the spirit or scope of the invention. Particularly, it should be understood that the present invention may be embodied in the following forms.

In the above embodiment, the number of the resistor elements R9 to R14 between the connection nodes N1 and N3 is the same as the number of resistor elements R29 to R34 between the connection nodes N2 and N4. However, the number of resistor elements between the connection nodes N1 and N3 may differ from the number of resistor elements between the connection nodes N2 and N4. Further, the resistances of the resistor elements R9 to R14 and the resistances of the resistor elements R29 to R34 do not all have to be the same. However, when the positive and negative temperature coefficients of the resistor elements used in the temperature compensation circuit 21 are substantially the same, it is preferred that the node connecting a node where the voltage changes (falls or rises) by a predetermined voltage from the voltage at the connection node N1 and a node where the voltage changes (falls or rises) by the same predetermined voltage from the voltage at the connection node N2 be used as the output terminal. In this case, changes in the voltage at the output terminal can easily be set.

In the above embodiment, the temperature compensation circuit 21 includes the five output terminals NT1 to NT5. However, the number of the output terminals can be freely changed in accordance with the number of resistors between the connection nodes N1 and N3 or the number of resistors between the connection nodes N2 and N4. Further, a node connecting the connection nodes N1 and N2 may be used as the output terminal of the temperature compensation circuit 21; and a node connecting the connection nodes N3 and N4 may be used as the output terminal of the temperature compensation circuit 21.

In the above embodiment, the first to eighth resistor means are each formed by two resistor elements. However, the number of resistor elements in each resistor means is not limited in such a manner. For example, the first and fourth resistor means in the reference circuit C1 may each be formed by a resistor element having a negative temperature coefficient, and the fifth and eighth resistor means in the complementary circuit C2 may each be formed by a resistor element having a positive temperature coefficient. Further, the second, third, sixth, and seventh resistor means may each be formed by a resistor element having a negative temperature coefficient and a resistor element having a positive temperature coefficient. In this case, the sixth and seventh resistor means are set so that their resistances change in a manner symmetric to changes in the resistances of the second and third resistor means. For example, when the second and third resistor means are each formed by two resistor elements having a negative temperature coefficient and one resistor element having a positive temperature coefficient, the sixth and seventh resistor means may each be formed by two resistor elements having a positive temperature coefficient and one resistor element having a negative temperature coefficient.

In the above embodiment, the second, third, sixth, and seventh resistor means are each formed by one resistor element having a positive temperature coefficient and one resistor element having a negative temperature coefficient. Instead, the second and third resistor means may be formed by resistor elements having a positive temperature coefficient, and the sixth and seventh resistor means may be formed by resistor elements having a negative temperature coefficient.

In the above embodiment, the ground voltage line for the ground voltage GND is used as the low potential power supply voltage line. The voltage at the low potential power supply voltage line is not limited to 0 V.

In the above embodiment, the temperature compensation circuit 21 is incorporated in the output amplification circuit 15 of the acceleration detector 10. However, the temperature compensation circuit 21 may be applied to any circuit required to have output voltage linearity with respect to temperature changes.

The present examples and embodiments are to be considered as illustrative and not restrictive, and the invention is not to be limited to the details given herein, but may be modified within the scope and equivalence of the appended claims.

What is claimed is:

1. A temperature compensation circuit comprising:
   a first resistor means and a second resistor means connected in series between a high potential power supply voltage line and a low potential power supply voltage line;
   a third resistor means and a fourth resistor means connected in series between the high potential power supply voltage line and the low potential power supply voltage line;
   a fifth resistor means and a sixth resistor means connected in series between the high potential power supply voltage line and the low potential power supply voltage line;
   a seventh resistor means and an eighth resistor means connected in series between the high potential power supply voltage line and the low potential power supply voltage line;
   a ninth resistor means connecting a first connection node of the first resistor means and the second resistor means and a second connection node of the third resistor means and the fourth resistor means;
   a tenth resistor means connecting a third connection node of the fifth resistor means and the sixth resistor means and a fourth connection node of the seventh resistor means and the eighth resistor means;
   wherein the first and fourth resistor means have a first characteristic, which is a negative temperature coefficient that decreases the resistance as the temperature rises;
   the second and third resistor means have a second characteristic, which is a temperature coefficient that is greater than the temperature coefficient of the first characteristic;
   the fifth and eighth resistor means have a third characteristic, which is a positive temperature coefficient that varies symmetrically to the first characteristic; and
   the sixth and seventh resistor means have a fourth characteristic, which is a temperature coefficient that is smaller than the temperature coefficient of the third characteristic and varies symmetrically to the second characteristic; and
   an output terminal defined by a node connecting a first connection line, which connects the first connection node and the second connection node, and a second connection line, which connects the third connection node and the fourth connection node.

2. The temperature compensation circuit according to claim 1, further comprising:
   first resistor elements having a negative temperature coefficient; and second resistor elements having a positive temperature coefficient;

wherein the first and fourth resistor means are formed by the first resistor elements;

the fifth and eighth resistor means are formed by the second resistor elements; and the second, third, sixth, and seventh resistor means are formed by the first resistor elements and the second resistor elements.

3. The temperature compensation circuit according to claim 2, wherein the first to eighth resistor means have the same resistance under a predetermined temperature, and the ninth resistor means and the tenth resistor means are formed by connecting a plurality of resistor elements in series, the temperature compensation circuit further comprising:

a plurality of output terminals connecting a node in the first connection line varied by a predetermined voltage from the potential at the first connection node and a node in the second connection line varied by the predetermined voltage from the potential at the fourth connection node.

4. A trimming circuit comprising:

the temperature compensation circuit according to claim 1; and a fuse provided for each output terminal of the temperature compensation circuit.

5. An acceleration detector comprising:

an output amplification circuit for amplifying an output of an acceleration sensor and including the trimming circuit according to claim 4.

* * * * *